N. H. SUREN.
TIME CONTROLLED MECHANISM.
APPLICATION FILED MAY 8, 1916.

1,346,858.

Patented July 20, 1920.

Witness.
H. B. Davis.

Inventor,
Nathan H. Suren

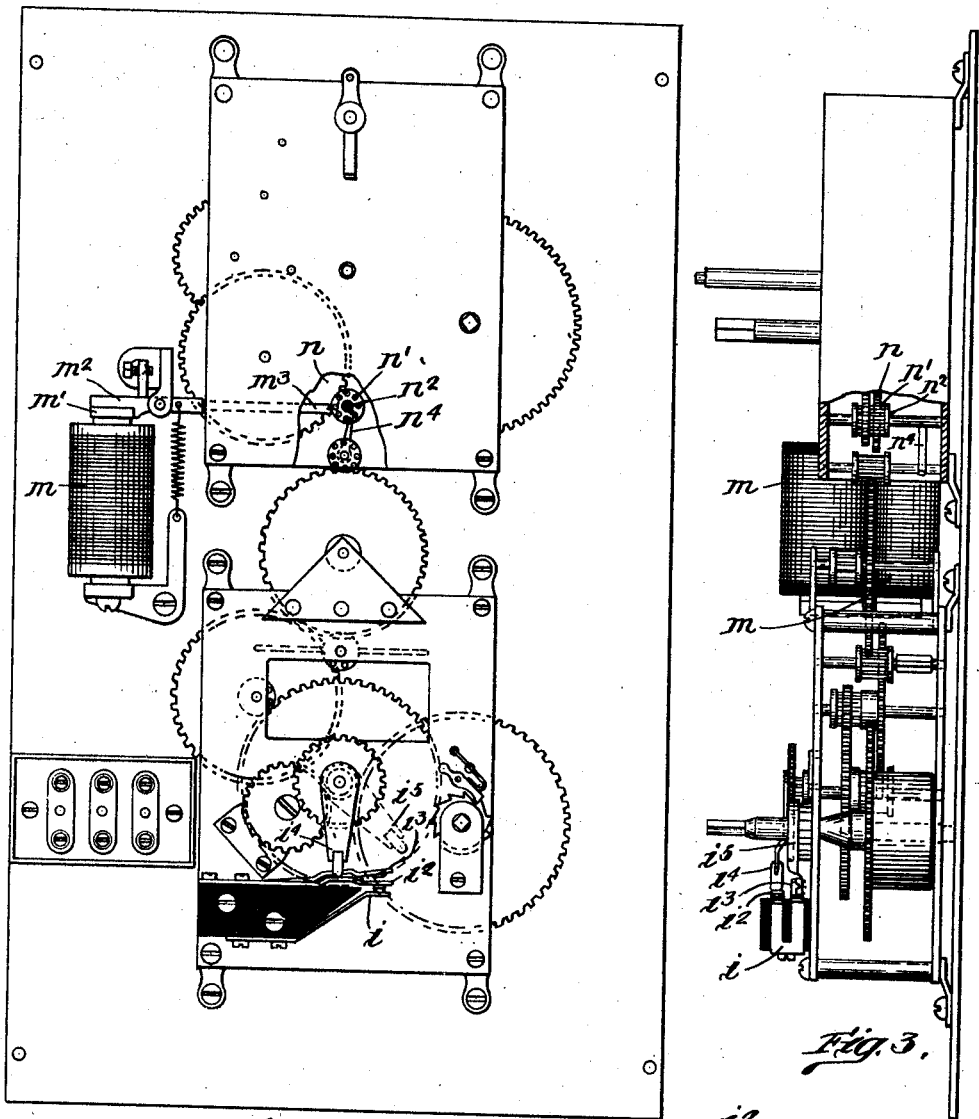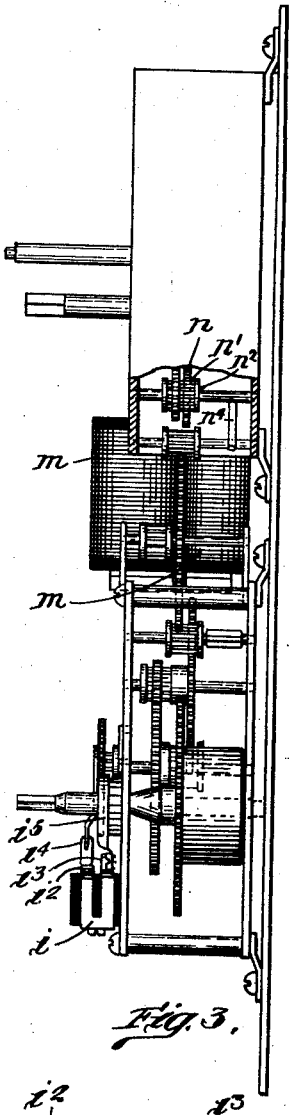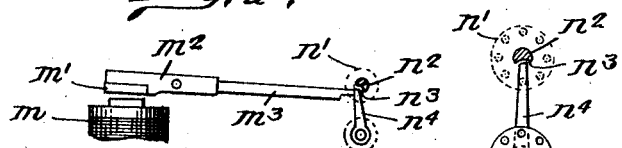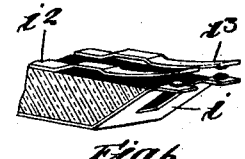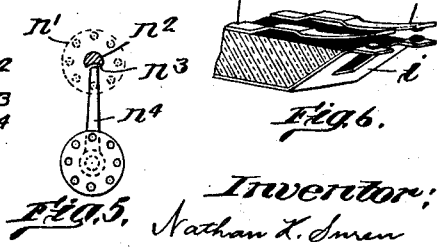

UNITED STATES PATENT OFFICE.

NATHAN H. SUREN, OF NEEDHAM, MASSACHUSETTS, ASSIGNOR TO THE GAMEWELL FIRE-ALARM TELEGRAPH COMPANY, OF NEW YORK, N. Y., A CORPORATION OF NEW YORK.

TIME-CONTROLLED MECHANISM.

1,346,858.  Specification of Letters Patent.  Patented July 20, 1920.

Original application filed July 22, 1910, Serial No. 573,291. Divided and this application filed May 8, 1916. Serial No. 96,003.

*To all whom it may concern:*

Be it known that I, NATHAN H. SUREN, a citizen of the United States, residing at Needham, in the county of Norfolk and State of Massachusetts, have invented an Improvement in Time-Controlled Mechanism, of which the following is a specification.

In another application #573,291, filed July 22, 1910, a charging system for storage batteries is shown having a time-controlled mechanism capable of controlling a switch-operating device, whereby a storage battery is adapted to be disconnected from a charging circuit at the end of a charging period, in case there is no interruption of the charging circuit, and whereby in case of interruption of the charging circuit, the time-controlled mechanism will be temporarily suspended during the period of interruption, resuming operation when the charging current returns, so that the battery will be charged for the full period of time for which the time-controlled mechanism is set.

The present invention has for its object the construction of a time-controlled mechanism suitable for the accomplishment of these results when associated with a switch-operating device, it being adapted to be controlled by the charging current.

The present application is a division of my aforesaid application.

Fig. 2 is an enlarged front view of the mechanism.

Fig. 3 is a side view of the mechanism shown in Fig. 2.

Figure 1:
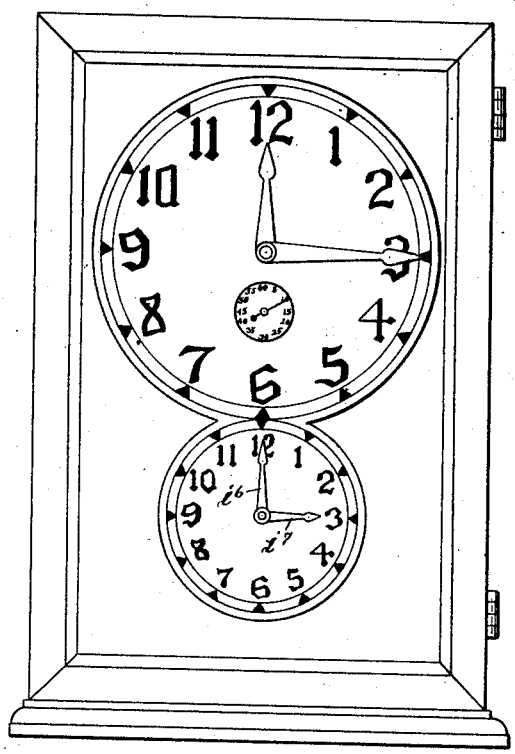
Figure 1 is a front view of a time-controlled mechanism, embodying this invention.

Figs. 4, 5, and 6 are fragmentary details to be referred to.

The circuit-closer for the circuit to be controlled, as here shown, comprises a wide contact-pen $i$ and two narrow spring-acting contact-pens $i^2$ and $i^3$, arranged above it, and circuit-wires are connected to said contact-pens, $i^2$ and $i^3$, so that to close the circuit both contact-pens $i^2$ and $i^3$ must be moved into engagement with the contact-pen $i$, the current then passing from one to the other narrow pen. My invention, however, is not limited to the employment of a circuit-closer of this kind, as such a circuit-closer requires for its operation two actuators, and my invention also includes one actuator.

The actuator or actuators for the circuit-closer are time-controlled. $i^4$, $i^5$ represent the two actuators. They are made as arms, and are mounted respectively on the hour and minute arbors of a clock-train of any well-known or suitable construction. They are adapted to be moved clockwise by hand into any desired position to set them, and to be moved counterclockwise by the train to return them to normal position. For the purpose of setting them, suitable indicator hands $i^6$, $i^7$, see Fig. 1, may be secured respectively to their shafts or arbors, which are arranged in front of and adapted to be moved over a suitable clock-dial. Normally both indicator-hands will point to 12, and, both actuators will be in engagement with their contact-pens, and, if it is desired that a storage battery shall be charged for a period of, say, four and a half hours, the minute hand will be turned four and a half times around the dial, leaving the hour-hand midway between 4 and 5, and the minute-hand at 6, and the actuators will be correspondingly moved. When the actuators are thus set, the circuit is open, and will remain open until they are both returned to normal. As the train operates, the actuators and indicator-hands are moved counterclockwise, and the actuator on the minute shaft will engage its contact-pen once each hour, but the actuator on the hour-shaft will not engage its contact-pen until it has resumed its normal position, and then, when the actuator on the minute-shaft has likewise resumed its normal position, both will be in engagement with their respective contact-pens and the circuit will be closed. If one actuator only is employed, then the actuator $i^4$ will be selected, as this actuator is arranged on the hour-shaft and the time usually required for charging the storage battery is of several hours' duration.

The circuit-closing train has a strong spring for driving it, and, as here shown, instead of providing it with a regulator of well-known form, another clock-train of any well-known form is employed for controlling its operation, whereby it is adapted to be repeatedly released, so that its operation and control may be intermittent.

Referring to Figs. 2 and 3, $n$ represents one of the train-wheels of the controlling-clock, and $n'$ a lantern-pinion which is engaged by said train-wheel, which is secured to a shaft $n^2$, having a recess $n^3$ in its side. A finger $n^4$ is secured to one of the wheels of the circuit-closing train, which is made long enough to coöperate with said shaft $n^2$ and to pass by said shaft when the recess $n^3$ is brought into position to permit the end of the finger to pass beneath the shaft, as shown in Fig. 5. The lantern-pinion $n'$ is designed to be rotated once a minute or thereabout, so that the finger $n^4$ is released at frequent intervals, and each time it is released the circuit-closing train is permitted to operate until said finger again engages the shaft. The circuit-closing train is thus intermittingly released by the controlling-train. The advantage of employing two actuators for the circuit-closer, both operated by a circuit-closing train or equivalent means, one arranged on the hour-shaft and the other on the minute-shaft, is that the circuit-closer is operated quickly by the actuator on the minute-shaft to close the circuit when the actuator on the hour-shaft has resumed its normal position. This quick movement of the actuator which is borne by the minute-shaft is accelerated by the movement of the train, which, it will be noted, is not provided with a regulator, and which operates intermittingly, for in such case it may be caused to operate quickly each time it is released. Employing a separate train or equivalent means for operating the actuators, the operation of which is controlled by a clock-train, permits the employment of a strong actuating-spring for the operating-means, which is very desirable.

It frequently happens that the charging current for a storage battery is interrupted, and to adapt the present time-controlled mechanism for this purpose, means are provided for causing a corresponding cessation of the circuit-closing train during such interruption, so that the actuators will be temporarily held at rest and the period of time for charging will not be unnecessarily consumed. In carrying out this feature an electro-magnet $m$ is employed, which controls the running of the train, and as here shown, the armature $m'$ of said magnet is attached to an armature-lever $m^2$, having an extension $m^3$, which terminates in the path of movement of the finger $n^4$. When the armature is attracted, said lever is lifted high enough to permit the finger to pass beneath it, but when said armature is retracted, said lever will fall into the path of movement of the finger so as to stop the circuit-closing train; yet said train will immediately start again as soon as the armature is again attracted.

The electromagnet $m$ is designed to be included in a different circuit from the contact-pens, and is, therefore, controlled from another source, as for instance it may be included in a charging circuit or a circuit under the influence of a charging current, so that when influenced thereby the magnet will attract its armature and release the train, and when such influence ceases, whether by a temporary interruption thereof or at the end of a charging period, the armature will be retracted and will arrest the train, although as before stated such arresting of the train may be temporary or permanent according to the conditions.

The time-controlled mechanism embodying this invention, while especially adapted for controlling a circuit-closer, may be employed for controlling other elements.

I claim:—

In a time-controlled mechanism, an element adapted to be controlled, an actuator for controlling said element adapted to be set in different positions by hand away from a normal controlling position, spring-actuated means to return said actuator to its controlling position, and time-controlled releasing-means for said spring-actuated means, and independent of but associated with said spring-actuated means.

In testimony whereof I have signed my name to this specification in the presence of two subscribing witnesses.

NATHAN H. SUREN.

Witnesses:
B. J. NOYES,
H. B. DAVIS.